US011487300B2

(12) United States Patent
Gaither et al.

(10) Patent No.: US 11,487,300 B2
(45) Date of Patent: Nov. 1, 2022

(54) HOME IMPROVEMENT STORE AUTONOMOUS WORKHORSE

(71) Applicant: Toyota Motor Engineering & Manufacturing North America, Inc., Plano, TX (US)

(72) Inventors: Geoffrey D. Gaither, Brighton, MI (US); Joshua D. Payne, Ann Arbor, MI (US); Nathan C. Westover, New Hudson, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 526 days.

(21) Appl. No.: 16/130,825

(22) Filed: Sep. 13, 2018

(65) Prior Publication Data
US 2020/0089257 A1    Mar. 19, 2020

(51) Int. Cl.
| G05D 1/02 | (2020.01) |
| G05D 1/00 | (2006.01) |
| G06Q 10/08 | (2012.01) |
| B65G 67/24 | (2006.01) |
| B65G 67/04 | (2006.01) |

(52) U.S. Cl.
CPC .......... G05D 1/0295 (2013.01); B65G 67/04 (2013.01); B65G 67/24 (2013.01); G05D 1/0088 (2013.01); G06Q 10/083 (2013.01); G05D 2201/0213 (2013.01); G05D 2201/0216 (2013.01)

(58) Field of Classification Search
CPC ......... G05D 1/0088; G05D 2201/0212; G05D 2201/0213; G05D 2201/0206; G06Q 10/08
See application file for complete search history.

(56) References Cited

U.S. PATENT DOCUMENTS

| 8,204,624 B2 | 6/2012 | Zini et al. |
| 9,373,149 B2 | 6/2016 | Abhyanker |
| 9,412,280 B1 | 8/2016 | Zwillinger et al. |
| 9,552,564 B1 | 1/2017 | Martenis |
| 9,573,684 B2 | 2/2017 | Kimchi et al. |
| 10,239,544 B1 * | 3/2019 | DeMartine ................ B61C 3/00 |
| 10,303,171 B1 * | 5/2019 | Brady .................... G08G 1/207 |

(Continued)

FOREIGN PATENT DOCUMENTS

| WO | WO2017085314 | 5/2017 |
| WO | WO2017156586 | 9/2017 |

Primary Examiner — Donald J Wallace
(74) Attorney, Agent, or Firm — Snell & Wilmer LLP

(57) ABSTRACT

An autonomous workhorse vehicle includes a main body including a platform to support a plurality of objects, a tracking sensor to detect a location of the main body relative to a leading vehicle, and an input/output port to receive an identifier of the leading vehicle. The autonomous workhorse vehicle further includes a power source to provide power to propel the main body, a steering actuator designed to adjust an orientation of the main body, and an ECU. The ECU is designed to receive the identifier of the leading vehicle. The ECU is further designed to determine a following time to begin following the leading vehicle. The ECU is further designed to control the power source and the steering actuator to move the main body to follow the leading vehicle at the following time based on the detected location of the main body relative to the leading vehicle.

20 Claims, 7 Drawing Sheets

(56) References Cited

U.S. PATENT DOCUMENTS

| | | | |
|---|---|---|---|
| 2009/0295171 A1* | 12/2009 | Gezel | H02K 7/1815 |
| | | | 290/10 |
| 2011/0320828 A1* | 12/2011 | Boss | H02J 13/00004 |
| | | | 713/300 |
| 2014/0279658 A1 | 9/2014 | Lievens et al. | |
| 2014/0306832 A1* | 10/2014 | Goose | G08C 17/02 |
| | | | 340/870.09 |
| 2015/0006005 A1 | 1/2015 | Yu et al. | |
| 2015/0301532 A1* | 10/2015 | Norris | B62D 1/286 |
| | | | 701/23 |
| 2016/0334797 A1* | 11/2016 | Ross | G06Q 10/08 |
| 2017/0107055 A1* | 4/2017 | Magens | B66F 9/145 |
| 2017/0236092 A1 | 8/2017 | High et al. | |
| 2017/0291766 A1 | 10/2017 | Orth et al. | |
| 2017/0293294 A1 | 10/2017 | Atchley et al. | |
| 2017/0308098 A1 | 10/2017 | Yu et al. | |
| 2017/0364074 A1* | 12/2017 | Lau | G06Q 50/28 |
| 2018/0024554 A1 | 1/2018 | Brady et al. | |
| 2018/0068368 A1* | 3/2018 | Mattingly | G05B 19/0428 |
| 2018/0158018 A1 | 6/2018 | Luckay et al. | |
| 2018/0281657 A1* | 10/2018 | Healey | G06Q 30/0241 |
| 2019/0019149 A1* | 1/2019 | Dixon | G06Q 10/08355 |
| 2019/0035044 A1* | 1/2019 | Ferguson | H04W 4/024 |
| 2019/0066038 A1* | 2/2019 | O'Brien | G05D 1/0297 |
| 2019/0180236 A1* | 6/2019 | Greenberger | G06Q 10/08355 |
| 2019/0217477 A1* | 7/2019 | Paepcke | G06F 3/017 |
| 2020/0176990 A1* | 6/2020 | Bhat | H02J 3/34 |

\* cited by examiner

HOME IMPROVEMENT STORE AUTONOMOUS WORKHORSE

BACKGROUND

1. Field

The present disclosure relates to systems and methods for providing a platform for autonomous delivery of objects purchased at a store or purchased remotely.

2. Description of the Related Art

Many home improvement stores have trucks or other vehicles available for rent to their customers. These trucks may be rented if a user has purchased too many goods to fit in their personal vehicles, purchased large goods, or does not wish to load the goods into their personal vehicles. Such a system may be undesirable because it results in wasted time of the individual as they will need to drive the rented vehicle to their house, unload the goods, then return the rented vehicle, and then drive their personal vehicle back home. Additionally, if a user purchases incorrect goods, they must return to the store with the old goods, purchase new goods, and again drive the rented vehicle to their house. Also, if a user is replacing a large appliance with a new appliance, they must also make plans to have the old appliance removed and taken to a return site, a recycle site, or a dump site. This undesirably produces many steps that a user must take to replace a large appliance. Also, if a user purchases a large appliance, they may be unable to load and unload the appliance themselves, causing them to have to hire help. These are all inefficient, costly, and time-consuming tasks.

Therefore, systems and methods for autonomous transport and delivery of purchased goods is desirable.

SUMMARY

Described herein is an autonomous workhorse vehicle. The autonomous workhorse vehicle includes a main body including a platform designed to support a plurality of objects. The autonomous workhorse vehicle further includes a tracking sensor designed to detect a location of the main body relative to a leading vehicle. The autonomous workhorse vehicle further includes an input/output port designed to receive an identifier of the leading vehicle. The autonomous workhorse vehicle further includes a power source designed to provide power to propel the main body. The autonomous workhorse vehicle further includes a steering actuator designed to adjust an orientation of the main body. The autonomous workhorse vehicle further includes an electronic control unit (ECU) coupled to the tracking sensor, the input/output port, the power source, and the steering actuator. The ECU is designed to receive the identifier of the leading vehicle. The ECU is further designed to determine a following time to begin following the leading vehicle. The ECU is further designed to control the power source and the steering actuator to move the main body to follow the leading vehicle at the following time based on the detected location of the main body relative to the leading vehicle.

Also disclosed is another autonomous workhorse vehicle. The autonomous workhorse vehicle includes a main body including a platform designed to support a plurality of objects. The autonomous workhorse vehicle further includes an input/output port designed to receive an identifier of a delivery object to be delivered from a remote device and a delivery address corresponding to an address at which the delivery object is to be delivered. The autonomous workhorse vehicle further includes a power source designed to provide power to propel the main body. The autonomous workhorse vehicle further includes a steering actuator designed to adjust an orientation of the main body. The autonomous workhorse vehicle further includes a loading actuator designed to facilitate movement of the delivery object onto the platform. The autonomous workhorse vehicle further includes an electronic control unit (ECU) coupled to the input/output port, the power source, the steering actuator, and the loading actuator. The ECU is designed to receive the identifier of the delivery object and the delivery address. The ECU is further designed to control the power source and the steering actuator to move the main body through a warehouse to a location of the delivery object. The ECU is further designed to control the loading actuator to facilitate the movement of the delivery object onto the platform. The ECU is further designed to control the power source and the steering actuator to move the main body to the delivery address.

Also disclosed is a method for autonomously delivering one or more object. The method includes receiving, by an input device, an identifier of a leading vehicle. The method also includes determining, by an electronic control unit (ECU), a following time to begin following the leading vehicle. The method also includes detecting, by a tracking sensor, a location of a main body having a platform for supporting the one or more object relative to a leading vehicle. The method also includes controlling, by the ECU, a power source and a steering actuator to move the main body to follow the leading vehicle at the following time based on the detected location of the main body relative to the leading vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for facilitating delivery and other distribution of objects from a store or a warehouse. The systems and methods provide multiple benefits and advantages such as delivery of the objects from the store or the warehouse by an autonomous vehicle, advantageously saving the time of the purchaser or the user. The systems and methods also advantageously assist in loading and unloading the goods from the vehicle, making the loading and unloading easier for the purchaser or the user. The systems and methods also provide the benefit of allowing items to be returned to the vehicle rather than the store, saving a trip to the store by the purchaser or the user. The systems and methods also advantageously allow the user to load an old part, such as a broken appliance, onto the vehicle for delivery to a recycle plant or dump, again saving the user time. The systems and methods also provide the benefit of being usable as a kiosk such that they can make money for a store during hours in which the store is closed.

An exemplary system includes a main body having a platform for supporting an object. The system further includes a power source for powering the vehicle and a steering actuator for steering the vehicle. The system further includes a loading actuator to facilitate loading of the object onto the vehicle. The system also includes an input/output port that can receive user input directly from a user or from a remote device. The system also includes an electronic control unit (ECU). The ECU can control the power source and the steering actuator to maneuver the vehicle behind a leading vehicle or to a delivery address based on the received input. The ECU can also control the loading actuator to load or unload the object from the vehicle also based on the received input.

Figure 1:
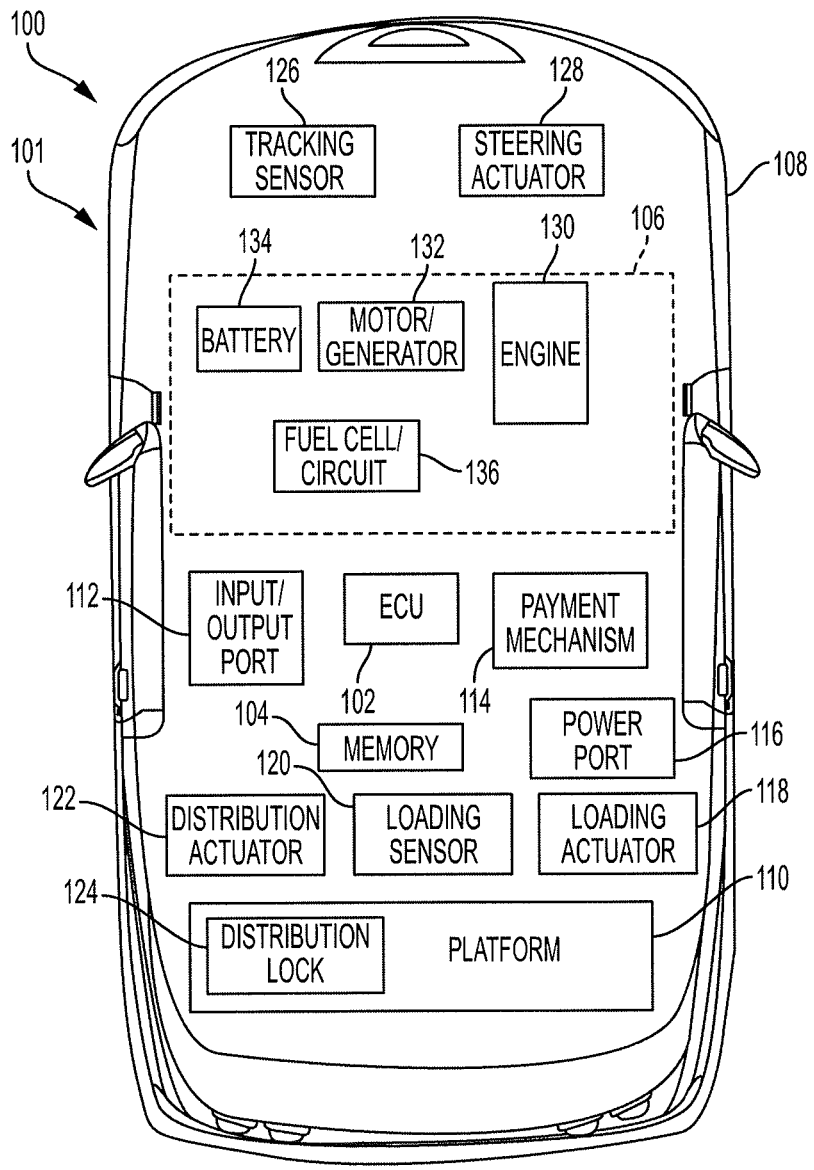
FIG. 1 is a block diagram illustrating an autonomous workhorse vehicle designed to deliver and otherwise distribute objects according to an embodiment of the present invention.

Turning to FIG. 1, an autonomous workhorse vehicle 100 (or vehicle 100) includes a system 101 for providing a platform for delivery and other distribution of objects. The vehicle 100 (or system 101) may include an ECU 102, a memory 104, and a power source 106. The vehicle 100 (or system 101) may further include a main body 108 that includes a platform 110. The vehicle 100 (or system 101) may further include an input/output port 112, a payment mechanism 114, a power port 116, a loading actuator 118, a loading sensor 120, a distribution actuator 122, a distribution lock 124, a tracking sensor 126, and a steering actuator 128.

The power source 106 may include any one or more of an engine 130, a motor-generator 132, a battery 134, or a fuel-cell circuit 136. The engine 130 may convert a fuel into mechanical power for propelling the main body 108. In that regard, the engine 130 may be a gasoline engine, a diesel engine, a natural gas engine, or the like.

The battery 134 may store electrical energy. In some embodiments, the battery 134 may include any one or more energy storage devices including a battery, a flywheel, a super capacitor, a thermal storage device, or the like.

The fuel-cell circuit 136 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel-cell circuit 136 may be stored in the battery 134 and/or used by the motor-generator 132. In some embodiments, the vehicle 100 may include multiple fuel-cell circuits including the fuel-cell circuit 136.

The motor-generator 132 may convert the electrical energy stored in the battery 134 (or electrical energy received directly from the fuel-cell circuit 136) into mechanical power usable to propel the vehicle 100. The motor-generator 132 may further convert mechanical power received from the engine 130 or from wheels of the vehicle 100 into electricity, which may be stored in the battery 134 as energy and/or used by other components of the vehicle 100. In some embodiments, the motor-generator 132 may include a motor without a generator portion and, in some embodiments, a separate generator may be provided.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100, for example, behind a leading person or vehicle, from a starting location to a destination location, or the like. The ECU 102 may further control the vehicle 100 to avoid collisions while the vehicle 100 is traveling.

The memory 104 may include any non-transitory memory and may be capable of storing data usable by the ECU 102. For example, the memory 104 may store instructions usable by the ECU 102 to navigate the vehicle 100 from a starting location to a destination location, or the like. The memory 104 may store other data usable by the ECU 102 such as locations of objects to be purchased in a store or warehouse, a cost of various items stored on the platform 110, one or more home location of the vehicle 100, locations of one or more recycling or landfill site, or the like.

The main body 108 may resemble an automobile such as a car, a truck, a scooter, a boat, a jet ski, an aircraft, a golf cart, or the like. The platform 110 may include any platform capable of supporting at least one object. For example, the main body 108 may be pushed by a user through a store and items to be purchased or rented may be loaded on the platform 110. As another example, the main body 108 may be maneuvered through a warehouse by a user or by the ECU 102, and the loading actuator 118 may load items onto the platform 110. The ECU 102 may then control the vehicle 100 to follow a personal vehicle of a user (or to travel alone) to a location at which the objects will be unloaded and may then control the vehicle 100 to return to the home location.

The input/output port 112 may include any port capable of at least one of receiving data or outputting data. For example, the input/output port 112 may include an input device such as a keyboard, a touchscreen, a microphone, or the like. As another example, the input/output port may include an output device such as a display, a touchscreen, a speaker, or the like. As yet another example, the input/output port may include a port capable of communicating with a remote device via a wired or wireless interface, such as via Bluetooth, Wi-Fi, FireWire, Ethernet, or the like.

The payment mechanism 114 may include any mechanism capable of receiving payment for a rental or a purchase. For example, the payment mechanism 114 may include a physical payment mechanism such as a credit card reader or a cash receiving slot, or may include a port capable of receiving payment information such as Apple pay or the like.

The power port 116 may be coupled to the power source 106 and may at least one of receive or output electrical power. For example, a cable may be coupled to the power port 116 and to an external power source and power may be provided from the external power source to charge the battery 134. As another example, a cable may be coupled to the power port 116 and to a device located on the platform 110 and used to charge the device on the platform 110. As another example, a cable may be coupled to the power port 116 and to an electronic tool, and power from the battery 134 may be used to power the electronic tool. As yet another example, the power port 116 may transmit and/or receive wireless power. In that regard, a device may be located on the platform 110 and the device may receive electrical power wirelessly from the power port 116.

The loading actuator 118 may include any actuator capable of facilitating at least one of loading an object onto the platform 110 or unloading an object from the platform 110. For example, the loading actuator 118 may include any one or more actuator coupled together to form part of a robot arm, may extend a slide upward from the platform 110 to facilitate loading an object onto the platform 110 or extend a slide downward from the platform 110 to facilitate unloading an object from the platform 110, or the like.

The loading sensor 120 may include any one or more sensor capable of detecting whether one or more objects has been loaded onto the platform 110 or removed from the platform 110. For example, the loading sensor 120 may include a pressure sensor located on the platform 110, an inductive sensor capable of detecting the presence of an object on the platform 110, a wireless communication port capable of communicating with a wireless port (such as a radio frequency ID (RFID) tag) of an object to determine whether the object has been placed on the platform 110 or removed from the platform 110, or the like.

The distribution actuator 122 may facilitate movement of an object for sale or for rent from the platform 110 to a location away from the platform 110. For example, the distribution actuator 122 may actuate an item that is for sale from a location inside a locked unit to a location outside of the locked unit. As another example, the distribution actuator 122 may include a robot arm that moves an object from a locked or restricted location to another location from which the object may be retrieved. For example, one or more object may be available to rent from the vehicle 100 (a rental object) or one or more objects may be available for purchase from the vehicle 100 (a for sale object). The ECU 102 may receive a request to rent or purchase the object via the input/output port 112, may determine that payment has been received for the object via the payment mechanism 114, and may control the distribution actuator 122 to release the object.

The distribution lock 124 may include any lock or other mechanism that restricts release of an object from the platform 110. For example, the distribution lock 124 may include a case or other locking element that restricts release of the object from the platform 110. The ECU 102 may receive a request to rent or purchase the object via the input/output port 112, may determine that payment has been received for the object via the payment mechanism 114, and may control the distribution lock 124 to release the object.

The tracking sensor 126 may include any one or more sensor capable of detecting a location of an object (such as a leading vehicle or a leading person) relative to the main body 108. For example, the tracking sensor 126 may include a proximity sensor, a camera, a Bluetooth or Wi-Fi port (to determine the relative location of another Bluetooth or Wi-Fi enabled device), or the like.

The steering actuator 128 may be coupled to one or more wheel of the vehicle 100 and may be actuated by the ECU 102 to control steering of the vehicle 100.

The vehicle 100 may be used to ease shopping burdens of a user. In some situations, the vehicle 100 may be stored at a store or warehouse. A user may indicate his desire for the vehicle 100 to follow the user as the user is shopping in the store. In that regard, the ECU 102 may control the power source 106 and the steering actuator 128 to follow the user based on a relative location of the user as detected by the tracking sensor 126. The user may load items onto the platform 110. In some situations, the user may load the platform 110 after the user has completed shopping by moving items from a shopping cart onto the platform 110. In some embodiments, the loading actuator 118 may be controlled (such as by the ECU 102 or by input(s) received from the input/output port 112) to facilitate movement of the object or objects onto the platform 110.

Rather than rent a truck that the user may drive to deliver the object or objects and then return the truck and drive home in the personal vehicle of the user, the vehicle 100 may be designed to autonomously drive to a received destination location, or to follow the personal vehicle of the user based on the relative location as detected by the tracking sensor 126. In that regard, after the user has paid for the purchased items (via the payment mechanism 114 or at a payment kiosk or cash register) the ECU 102 may control the vehicle 100 to travel to the destination location or to follow the personal vehicle of the user to the destination location. In some embodiments, the user may indicate to the vehicle 100 when it is ready for the vehicle 100 to follow the personal vehicle of the user. For example, the user may provide such indication via the input/output port 112, and the user may provide an identification of his or her personal vehicle.

In some embodiments, a user may remotely purchase one or more objects using a remote device (such as a computer or mobile phone) and the purchase may be received via the input/output port 112. The ECU 102 may control the vehicle 100 to travel through a warehouse, and may control the loading actuator 118 to load each of the purchased objects onto the platform 110. After all objects have been loaded onto the platform 110, the ECU 102 may control the vehicle 100 to travel to the destination location. The destination location may include, for example, a business, a worksite, a preparation site (such as a professional shop), a home, or the like.

Once at the destination location, the user may unload the object or objects from the platform 110. In some embodiments, the ECU or the user may control the loading actuator 118 to unload the objects from the platform 110. The loading sensor 120 may detect when each of the objects has been removed from the platform 110. After the objects have been removed from the platform 110, the ECU 102 may control the vehicle 100 to return to the starting location (e.g., the warehouse) or to the next delivery address.

In some embodiments, the vehicle 100 may be shared by several stores. In that regard, the stores may indicate when the vehicle is desired, and the ECU 102 may control the vehicle 100 to travel to the next store at which it is desired.

In some embodiments, the vehicle 100 may travel with one or more objects on the platform 110 that are available for purchase or rent. For example, the vehicle 100 may travel with umbrellas or groceries for sale. If the vehicle 100 is not required or desired at any specific location (or if it is after hours) the ECU 102 may control the vehicle 100 to travel to a location at which the objects for sale are desired (such as a street corner in the rain). In that regard, the vehicle 100 may operate as a vending machine for the objects that are for sale.

The rental objects may include tools usable to install various objects. For example, the rental objects may include drills, hammers, screwdrivers, or the like. In that regard, as a user is installing an object that has been delivered, the user may indicate a desire to rent one or more tools, may pay for the rental via the payment mechanism 114, and the ECU 102 may control one or both of the distribution actuator 122 or the distribution lock 124 to release the rental objects from the platform 110.

In some embodiments, additional power may be required or desired at the destination location. In that regard, a user may connect one or more devices from which power is desired to the power port 116. The power port 116 may provide the power (such as from the battery 134, the fuel-cell circuit 136, or the motor-generator 132) to power the one or more devices. In some embodiments, the vehicle 100 may function as a home generator. In that regard, a user may connect an outlet at their home to the power port 116 and the power from the vehicle 100 may power one or more component of the home.

The vehicle 100 may provide additional features such as an air compressor, a dolly, a nail gun, or other tools that are useful for various projects or repairs. Such additional features may be available for rent, or such additional features may be provided free of charge.

The vehicle 100 may be capable of traveling off-road, through the air, on a road, or through water. In that regard, the vehicle 100 may operate as a land-based vehicle, an off-road vehicle, an aircraft, a watercraft, or the like.

A user may load an old object (such as a refrigerator that is being replaced) onto the platform 110 after the new object (such as a new refrigerator) has been removed from the platform 110. In some embodiments, the loading actuator 118 may facilitate loading of the old object onto the platform 110. In such embodiments, the ECU 102 may control the vehicle 100 to travel to a dumpsite or a recycling site to dump or recycle the old object.

In some embodiments, it may be desirable for the vehicle 100 to pick up professional workers in addition to picking up one or more objects for sale. For example, it may be desirable to pick up workers to assist in installing a deck or other home component, or to assist in providing home repair. In that regard, a user may request that one or more professionals travel with the object or objects to help with such installation or repair. The ECU 102 may control the vehicle 100 to travel to a location to pick up the one or more professionals prior to traveling to the destination location if such a request has been made.

In some embodiments, a user may sign up for a service in which specific objects are delivered in certain situations. For example, the user may request to rent a generator each time power goes out for more than a specified time (e.g., 15 minutes) in a certain area. In that regard, each time the power goes out, the ECU 102 may learn of such power outage. The ECU 102 may in turn control the vehicle 100 to pick up a generator and take the generator to the house of the individual so the individual can rent the generator until power is restored. Upon restoration of power, the ECU 102 may control the vehicle 100 to pick up the generator from the house of the individual and return it to its original location or to a new location.

The vehicle 100 may also be used to help individuals move between locations. In that regard, the vehicle 100 may be rented, may show up at the old location of the user, and may be loaded at the old location of the user. The vehicle 100 may then be programmed to depart from the old location of the user and travel to the new location of the user. The vehicle 100 may then be unloaded, and may return itself to the starting location or a new location, as desired.

In some embodiments, a user may wish to return one or more part, such as if it is damaged or is an incorrect part. For example, a user may purchase a handful of various screws, not knowing which one is correct. Upon learning which product or products are correct, the user may wish to return the remaining products. In that regard, the user may provide an indication of which products are being returned (such as via the input/output port 112) via the loading sensor 120 may detect the return of these parts, and the ECU 102 may issue a credit to an account associated with the user for the returned products.

In some embodiments, various vehicles similar to the vehicle 100 may be provided that have differing sizes. For example, the vehicle 100 may be provided in two sizes, three sizes, four sizes, or the like. A user may select a desired model of the vehicle 100 based on which product or products are being purchased or otherwise moved. Pricing for rental of the vehicle 100 may vary based on the desired model. Additionally, different models may include different features. For example, some models may provide a power port and others may not, some may provide an air compressor, and the like.

The vehicle 100 may be requested by a user in any of multiple manners. For example, the user may request to rent the vehicle 100 in a store, the vehicle may be requested online or in an app, or the like.

In some embodiments, a user may load a shopping cart or a dolly with objects in the store and may load the entire shopping cart or dolly onto the platform 110 of the vehicle 100. The vehicle 100 may then deliver the goods, including the shopping cart or dolly, to ease unloading of the goods.

Figure 2:
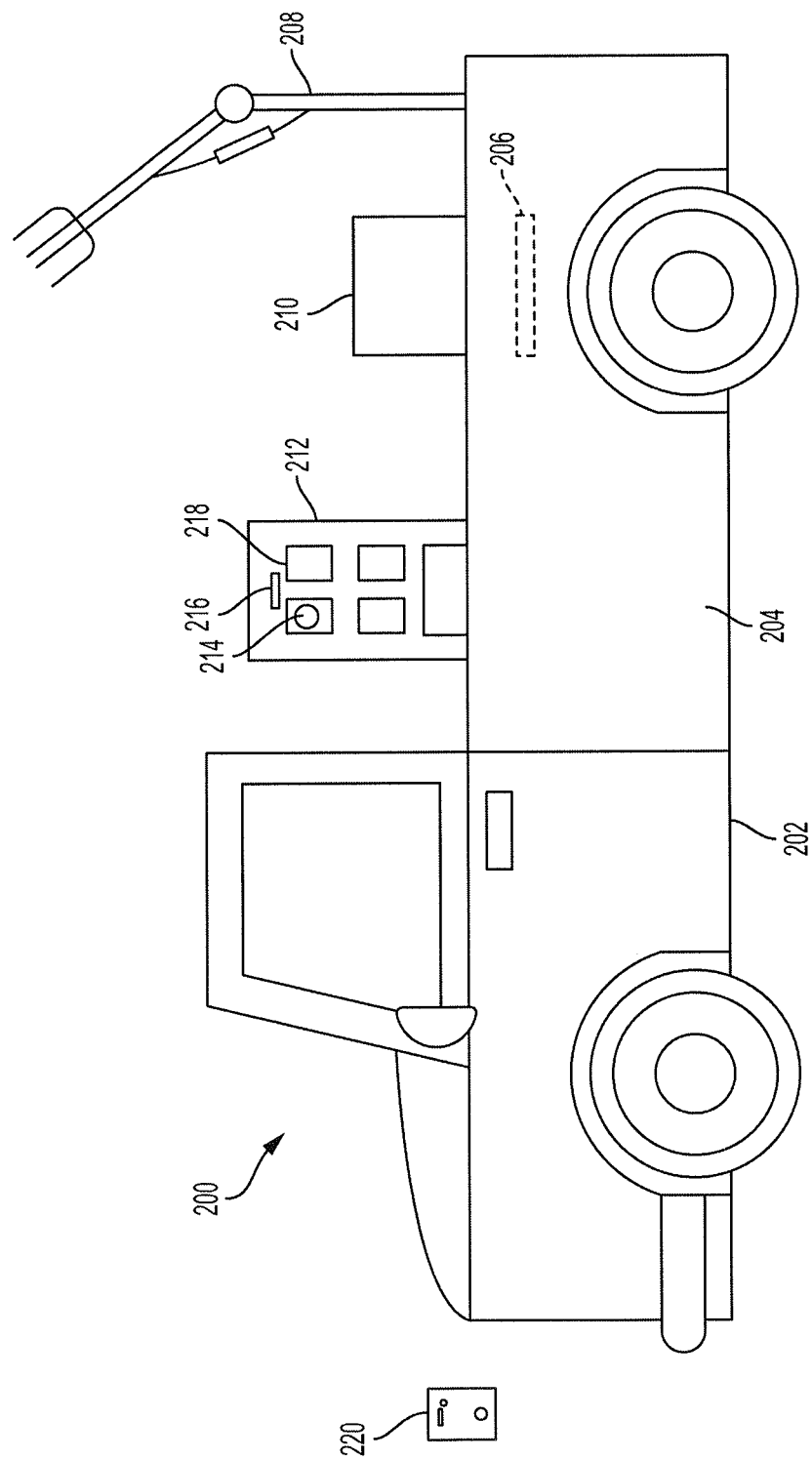
FIG. 2 is an exemplary autonomous workhorse vehicle designed to travel on a ground surface according to an embodiment of the present invention.

Turning now to FIG. 2, an autonomous workhorse vehicle 200, or vehicle 200, may include similar features as the vehicle 100 of FIG. 1. In particular, the vehicle 200 may have a main body 202 that includes a platform 204 capable of supporting one or more objects. The vehicle 200 may include a pressure sensor 206 that functions as a loading sensor by detecting the presence of one or more object 210 on the platform 204.

The vehicle 200 may further include a robot arm 208 as a loading actuator. The robot arm 208 may facilitate movement of the object 210 onto the platform 204 and off of the platform 204.

The vehicle 200 may further include a sales kiosk 212. The sales kiosk 212 may function as a distribution lock and may enclose one or more rental product or for sale product 218 therein. The sales kiosk 212 may include a payment mechanism 216 capable of receiving cash or a credit card. Upon payment for a rental product or for sale product, a distribution actuator 214 may actuate a rental product or for sale product 218 out of the sales kiosk 212 where it may be retrieved by a purchaser.

The vehicle 200 may communicate with a remote device 220. The remote device 220 may be used, for example, to request rental of the vehicle 200, to provide a delivery address for the object 210, to indicate when the object 210 has been removed from the platform 204, to provide a delivery time at which the objects are desired to be delivered, or the like. For example, the remote device 220 may be a mobile phone, a laptop, or the like, and may communicate with the vehicle 200 via a wired or wireless protocol.

Figure 3:
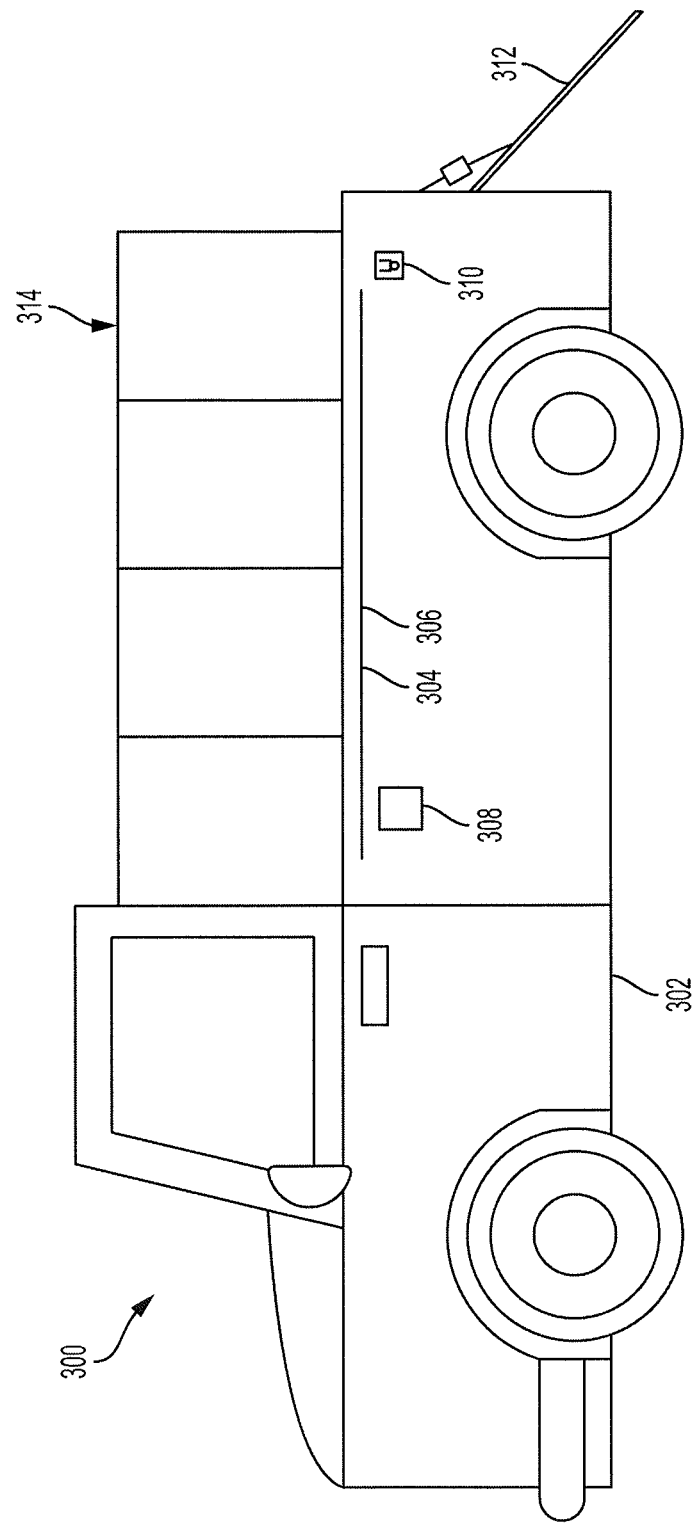
FIG. 3 is an exemplary autonomous workhorse vehicle designed to travel on a ground surface according to an embodiment of the present invention.

Turning now to FIG. 3, another vehicle 300 has similar features as the vehicle 100 of FIG. 1. In particular, the vehicle 300 has a main body 302 that includes a platform 304 for supporting a plurality of objects 314. The vehicle 300 further includes an inductive charging pad 306 and a touchscreen 308. The inductive charging pad 306 may provide a wireless charge to wirelessly charge batteries of the objects 314. The touchscreen 308 may function as an input device and an output device, and may be used to input a destination address or location, control a loading actuator 312, or the like.

The vehicle 300 may further include a power port 310 and the loading actuator 312. The power port 310 may output power usable to power one or more electric tools or to power other devices as desired. The loading actuator 312 may be raised in order to load the objects 314 onto the platform 304, and lowered in order to unload the objects 314 from the platform 304.

Figure 4:
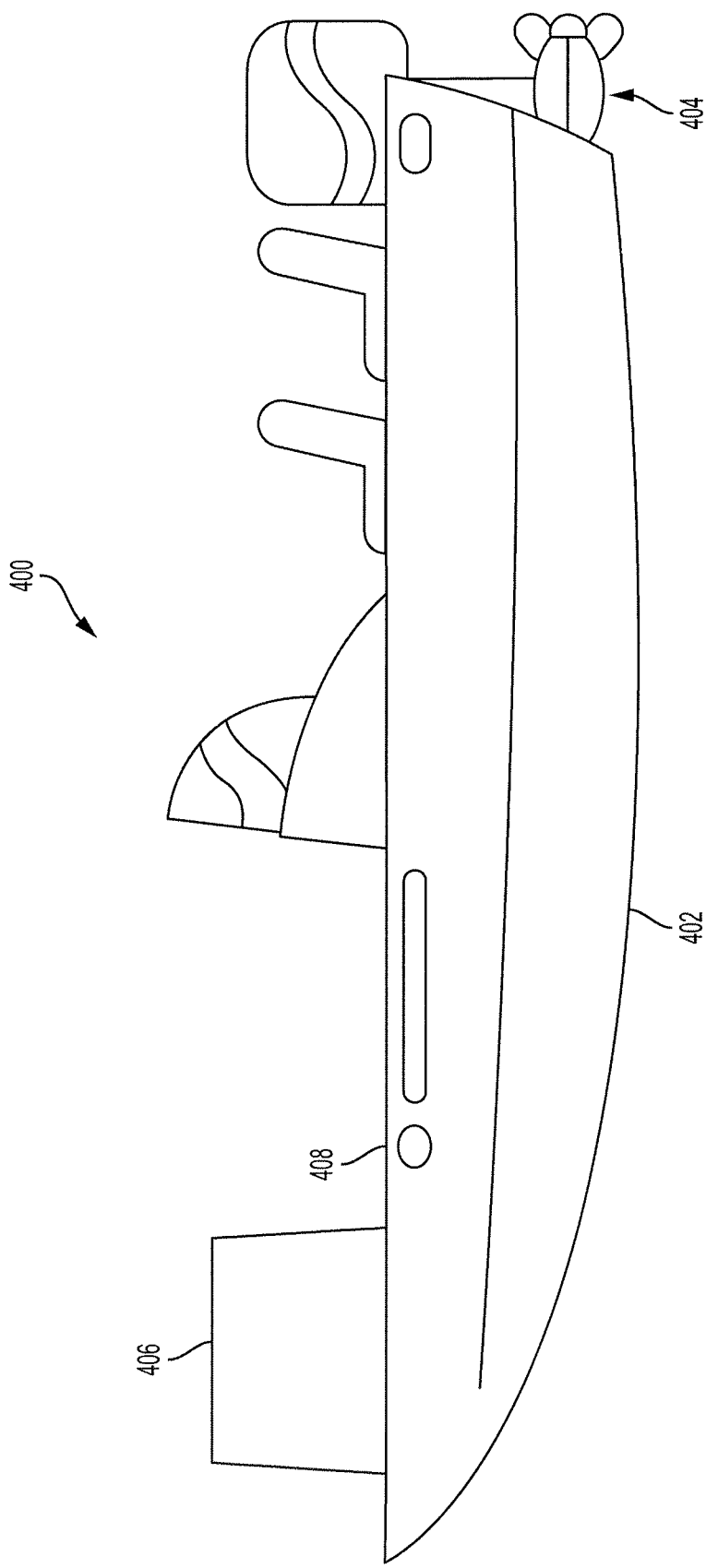
FIG. 4 is an exemplary autonomous workhorse vehicle designed to travel through water according to an embodiment of the present invention.

Referring now to FIG. 4, another vehicle 400 includes similar features as the vehicle 100 of FIG. 1. In particular, the vehicle 400 includes a main body 402 that is designed to float in water. The main body 402 includes a platform 408 onto which one or more object 406 may be loaded.

The vehicle 400 further includes a power source 404 which may be used to propel the vehicle 400 through water. For example, the power source 404 may include an engine and a propeller.

Figure 5:
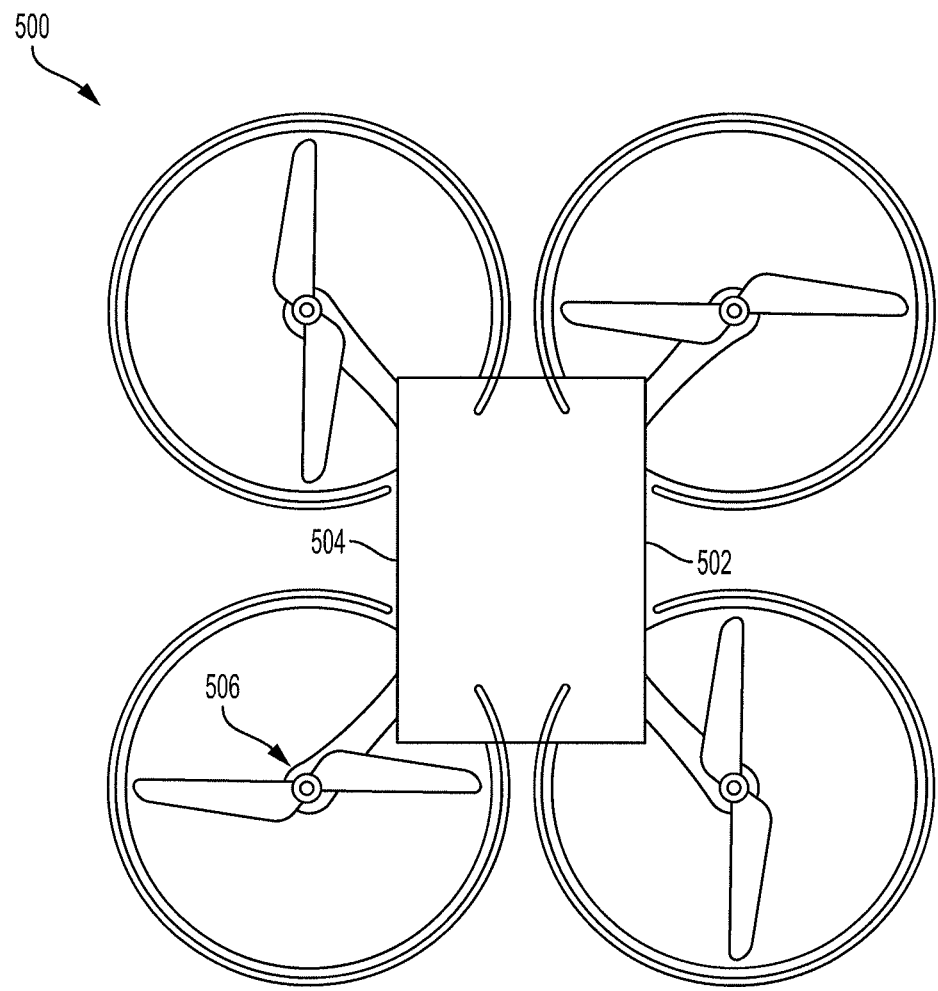
FIG. 5 is an exemplary autonomous workhorse vehicle designed to travel through air according to an embodiment of the present disclosure.

Referring now to FIG. 5, another vehicle 500 includes similar features as the vehicle 100 of FIG. 1. In particular, the vehicle 500 includes a main body 502 that is designed to fly through the air. The main body 502 includes a platform 504 onto which one or more object may be loaded. In some embodiments, the one or more objects may be suspended from the platform 504 rather than placed on a top surface of the platform 504. In that regard, where used in this context, a platform may support an object in any manner.

The vehicle 500 may further include a power source 506 that includes two to four (or more) motors and propellers. The motors and propellers may be used to propel the vehicle 500 through air. In some embodiments, the vehicle 500 may include any quantity of motors and propellers, may include one or more engine, or the like. Although shown as a copter configuration, the vehicle 500 may instead have a configuration similar to an airplane.

Figure 6A:
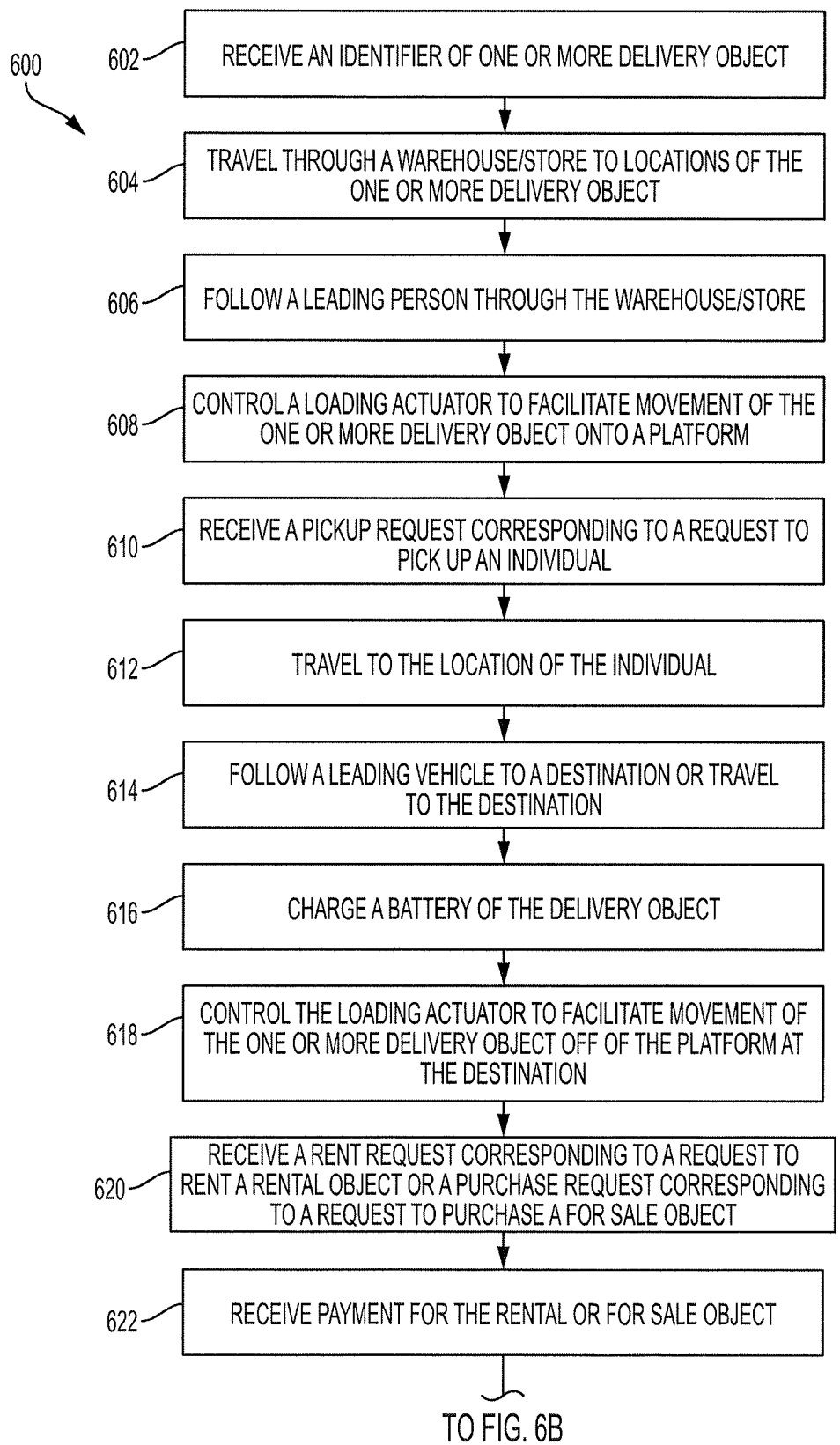
FIGS. 6A and 6B are flowcharts illustrating a method for controlling an autonomous workhorse vehicle according to an embodiment of the present disclosure.
Figure 6B:
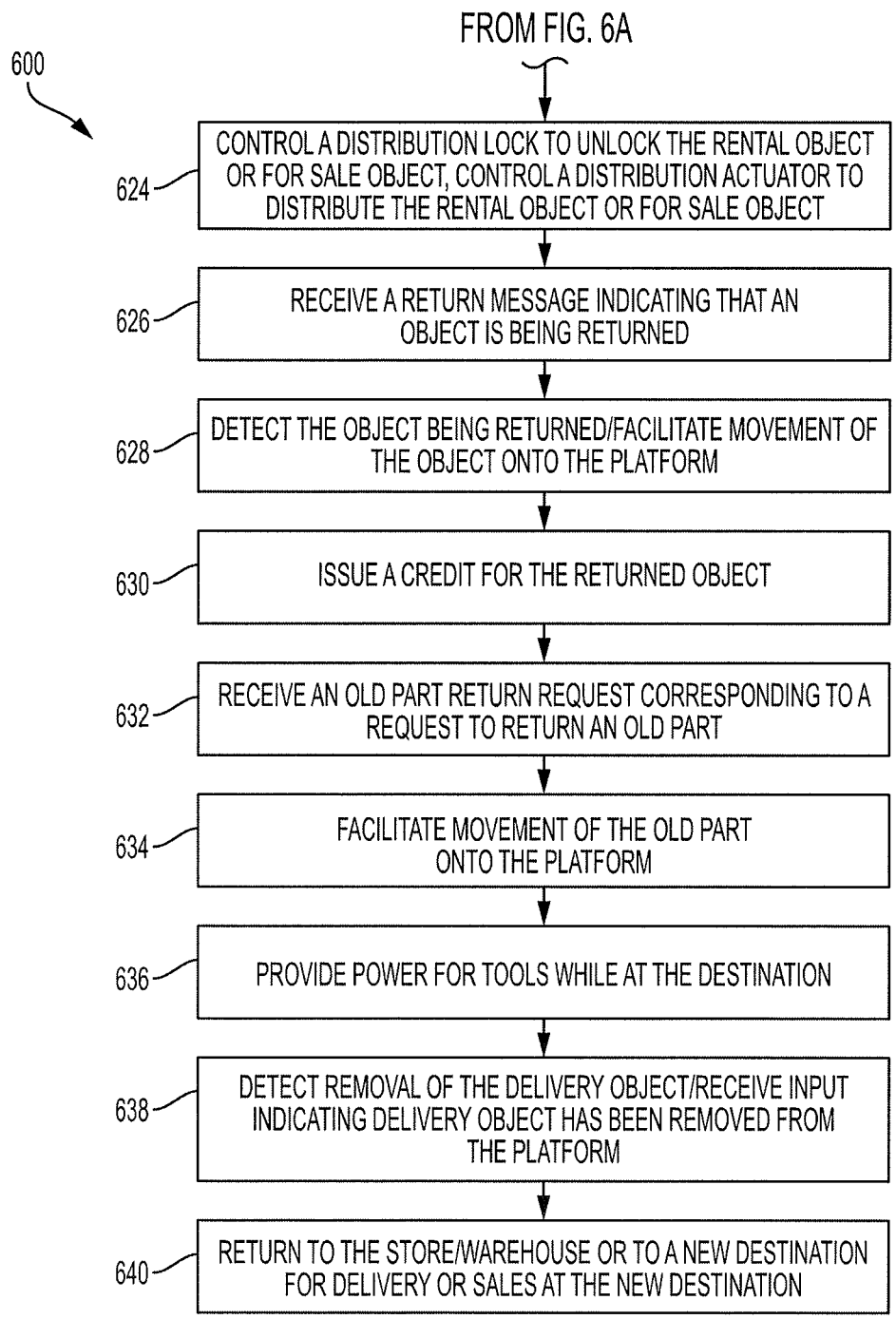

Referring now to FIGS. 6A and 6B, a method 600 may be performed by a vehicle similar to any of the vehicles 100, 200, 300, 400, or 500. In block 602, an ECU of the vehicle may receive an identifier of one or more delivery objects. For example, an input device of the vehicle may receive the identifier from a user at a store. As another example, a user may request one or more delivery objects using a remote device, and the list of delivery objects may be transferred to an input/output port of the vehicle.

The vehicle may include a map of a store or warehouse in which it is located that includes locations of various objects. In block 604, the vehicle may travel through a warehouse or store to the locations of the one or more delivery objects that was received in block 602. In some embodiments, the vehicle may travel through a store with a user. In that regard and in block 606, the ECU may control the vehicle to follow a leading person through the warehouse or store. For example, as the user enters the store, the user can indicate that the vehicle should follow the user through the store. The vehicle may determine the relative location of the leading person and may use that relative location to follow the leading person through the store.

In block 608, the ECU may control a loading actuator to facilitate movement of the one or more delivery objects onto a platform of the vehicle. For example, a user may point to the delivery object or may otherwise indicate the identity of the delivery object. Based on the stored map or the input from the user, the ECU may control the loading actuator to facilitate movement of the delivery object onto the platform. In some embodiments, a user may simply request that the loading actuator extend to facilitate movement of the delivery object onto the platform, and the user may place the delivery object onto the platform.

In block 610, the ECU of the vehicle may receive a pickup request corresponding to a request to pick up an individual between the store and warehouse at the destination location. For example, the pickup request may be provided by a user. In some embodiments, the pickup request may simply indicate a type of labor that is requested and the ECU may be programmed to go to a specific location associated with the type of labor. In some embodiments, the pickup request may include an address of the person or people to be picked up and the ECU may control the vehicle to travel to the address or destination location. The pickup request may include a time at which the individual is to be picked up. For example, the pickup request may include the address and time, and the ECU will control the vehicle to be at the address at a time near the pickup time (e.g., within 10 minutes of the pickup time, or within 30 minutes of the pickup time, or within an hour of the pickup time).

In block 612, the ECU may control the power source and the steering actuator of the vehicle to travel to the destination location of the individual that was received in block 610. In some embodiments, after the individual has entered the vehicle, the individual may use an input device to indicate that he or she has entered the vehicle. In some embodiments, the vehicle may include a sensor capable of detecting when the individual has entered the vehicle.

In block 614, the ECU may control the vehicle to follow a leading vehicle or to travel to a previously provided destination location. The ECU may be provided with information regarding whether to follow a leading vehicle or whether to travel to a destination location. For example, a user may provide input to the ECU regarding this decision. If the vehicle has been previously provided with a list of delivery objects to be delivered then the ECU may know to simply travel to the address after the delivery objects have been loaded onto the platform. If the ECU is following a user around the store, the user may indicate whether the vehicle should followed the leading vehicle or travel to the delivery address without following the leading vehicle.

In some embodiments, the ECU may be provided with a delivery time. For example, when placing an order, or paying at a store, a user may provide a time at which he or she desires the delivery objects to be delivered. The ECU may predict an amount of time that it will take to get to the delivery address and may cause the vehicle to depart its location at a time of day which allows the vehicle to reach the delivery address at the delivery time. For example, the ECU may cause the vehicle to depart at a time which will cause the vehicle to reach the delivery address within a predetermined amount of time of the delivery time such as 10 minutes, 15 minutes, 30 minutes, an hour, or the like of the delivery time. The predetermined amount of time may correspond to an amount of time which is considered reasonable for a delivery to be early or late.

In block 616, while the vehicle is traveling from the store or warehouse to the pickup address or the destination address, the ECU may control a power port of the vehicle to charge a battery of one or more delivery objects, sale objects, or rental objects that are to be loaded on the platform. For example, the ECU may be capable of receiving or otherwise determining a power level of each object on the platform. The ECU may charge the battery of each object based on the determined power level and based on the delivery address and order of each object. For example, the ECU may first charge objects that will be delivered first, may charge objects having the lowest power level first, or the like. The ECU may charge each object until the power level reaches or exceeds a predetermined threshold power level that corresponds to a minimum desirable amount of charge.

In block 618, the ECU may control the loading actuator to facilitate movement of the one or more delivery objects off of the platform at the destination location. This control may be based on a request from the user, may be determined by the ECU based on the specific destination address and a list of items to be delivered at the destination address, or the like. This unloading of the one or more delivery object may be performed in a similar manner as the loading in block 608.

In block 620, the ECU may receive a rent request corresponding to a request for a user to rent a rental object, or a purchase request corresponding to a request for a user to purchase a for sale object. The rent request or the purchase request may be received via an input device of the vehicle, or may be received from a user device of the user. For example, the rent request or the purchase request may be received while at a delivery address, or may be received while the vehicle is at another location, such as a street corner, a parking lot, or the like.

In block 622, the vehicle may receive payment for the rental or the for sale object. For example, the payment may be received by a payment mechanism and may include receipt of cash, insertion or swiping of a credit card, or payment via another means of payment such as Apple pay.

In block 624, the ECU may control a distribution lock to unlock the rental object or the for sale object, or may control a distribution actuator to distribute the rental object or the for sale object. For example, the ECU may control the unlocking or distribution of the rental object or the for sale object after receiving the rent request and after determining that payment has been received for the rental object or the for sale object.

In block 626, the vehicle may receive a return message indicating that one or more objects are being returned. For example, the message may indicate that a rental object is being returned, that a delivery object is being returned, or that a for sale object is being returned. The message may be received via an input device of the vehicle, may be received from a remote device, or the like. In some embodiments, a user may place the item to be returned in a specific location on the platform and the ECU may determine that the item is being returned based on the placement on the platform.

In block 628, a sensor may detect that the object being returned has been placed on the platform. In some embodiments, the ECU may control a loading actuator to load the object onto the platform. After facilitating movement of the object onto the platform or detecting that the object has been placed on the platform, the ECU may issue a credit for the returned object in block 630. For example, the ECU may issue a credit to an account associated with the user who is returning the object.

In block 632, the ECU may receive an old part return request corresponding to a request to return an old part. For example, the old part may include a refrigerator, a microwave, broken planks, or the like to be delivered to a recycling plant or a landfill. The old part return request may be received by an input device of the vehicle or may be received from a remote device of a user. In some embodiments, the old part return request may be received at the time a purchase request is received such that the user can ensure that room exists on the platform for the old part to be loaded thereon.

In block 634, the ECU may control a loading actuator to facilitate movement of the old part onto the platform. For example, the loading actuator may physically maneuver the old part onto the platform or may otherwise facilitate loading of the old part onto the platform.

In block 636, the vehicle may provide power for tools while at the destination location. For example, a user may request power to be provided and may plug in the device into a power port of the vehicle. In some embodiments, the ECU may charge a specific amount of money per unit of time that power is used, or per unit of power. In that regard, the ECU may keep track of the amount of time that power is used or the amount of power that is used and may debit an account associated with the user for the use of power.

In block 638, a sensor may detect removal of the delivery object or the vehicle may receive input indicating that the delivery object has been removed from the platform. For example, the sensor may include a pressure sensor, an inductive sensor, a camera, a radar sensor, a LIDAR sensor, or the like.

In block 640, the vehicle may return to the store or the warehouse, may travel to a new destination for delivery or sales at the new destination, or may travel to a recycling plant or dump for unloading of an old part. For example, if the vehicle is requested at a store and has been unloaded, the ECU may control the vehicle to return to the store. As another example, if additional delivery objects are located on the vehicle, the vehicle may travel to the delivery address of the additional delivery objects. If it is after hours, the vehicle may travel to a location at which it may continue to sell or rent parts. If the vehicle has been loaded with an old part, the ECU may be aware of whether the old part should be recycled or taken to a dump, and may control the vehicle accordingly.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An autonomous workhorse vehicle, comprising:
 a main body including a platform configured to support a plurality of objects, at least one of the plurality of objects requiring or being required for an installation or repair work;
 a tracking sensor configured to detect a location of the main body relative to a leading object;

a power source configured to provide power to propel the main body;

an inductive charging pad coupled to the platform and the power source and configured to wirelessly charge a battery of the at least one of the plurality of objects using at least some of the power from the power source;

a steering actuator configured to adjust an orientation of the main body; and an electronic control unit (ECU) coupled to the tracking sensor, the power source, the inductive charging pad, and the steering actuator and configured to:
  charge the battery of the at least one of the plurality of objects based on a delivery address or an order of delivery of the at least one of the plurality of objects,
  receive data indicative of a request for at least one worker to perform the installation or repair work on or with the at least one of the plurality of objects,
  notify the at least one worker regarding the installation or repair work,
  determine a following time to begin following the leading object, and
  control, based on the detected location of the main body relative to the leading object, the power source and the steering actuator to move the main body to follow the leading object at the following time.

2. The autonomous workhorse vehicle of claim 1, further comprising:
an input/output port configured to receive user input indicating that the main body is to follow a leading person;
wherein:
  the tracking sensor is further configured to detect a location of the main body relative to the leading person, and
  the ECU is further configured to control, based on the detected location of the main body relative to the leading person, the power source and the steering actuator to move the main body to follow the leading person in response to the input/output port receiving the user input.

3. The autonomous workhorse vehicle of claim 1, further comprising:
a loading actuator configured to facilitate movement of at least another one of the plurality of objects onto the platform; and
an input/output port configured to receive a user request to facilitate the movement of the at least another one of the plurality of objects onto the platform;
wherein the ECU is further configured to control the loading actuator to facilitate the movement of the at least another one of the plurality of objects onto the platform in response to the input/output port receiving the user request.

4. The autonomous workhorse vehicle of claim 1, further comprising:
a loading actuator configured to facilitate movement of at least another one of the plurality of objects onto the platform; and
an input/output port configured to receive, from a remote device, a list of the plurality of objects, wherein:
  the ECU is further configured to control the power source and the steering actuator to move the main body through a warehouse to each location of each one of the plurality of objects and to control the loading actuator to facilitate the movement of the each one of the plurality of objects onto the platform in response to the input/output port receiving the list of the plurality of objects.

5. The autonomous workhorse vehicle of claim 1, further comprising a loading sensor configured to detect whether each one of the plurality of objects has been removed from the platform, wherein the ECU is further configured to control the power source and the steering actuator to cause the main body to return to a home location in response to the loading sensor detecting that the each one of the plurality of objects has been removed from the platform.

6. The autonomous workhorse vehicle of claim 1, further comprising:
a payment mechanism configured to receive payment including at least one of a credit card slot configured to receive a credit card or a cash slot configured to receive cash; and
a distribution actuator configured to actuate at least another one of the plurality of objects from the platform to a location away from the platform,
wherein the ECU is further configured to:
  determine that the payment mechanism has received the payment,
  receive, from an input/output port, a request to purchase the at least another one of the plurality of objects, and
  cause the distribution actuator to actuate the at least another one of the plurality of objects from the platform to the location away from the platform in response to determining that the payment mechanism has received the payment and in response to receiving the request to purchase the at least another one of the plurality of objects.

7. The autonomous workhorse vehicle of claim 1, further comprising:
an input/output port configured to receive a return message from a user device indicating that the at least one of the plurality of objects is being returned, wherein the ECU is further configured to generate a credit to an account associated with the user device in response to receiving, via the input/output port, the return message.

8. An autonomous workhorse vehicle, comprising:
a main body including a platform configured to support a plurality of objects, at least one of the plurality of objects being a delivery object requiring or being required for an installation or repair work;
an input/output port configured to receive an identifier of the delivery object to be delivered from a remote device and a delivery address corresponding to an address at which the delivery object is to be delivered;
a power source configured to provide power to propel the main body;
an inductive charging pad coupled to the platform and the power source and configured to wirelessly charge a battery of the delivery object using at least some of the power from the power source;
a steering actuator configured to adjust an orientation of the main body;
a loading actuator configured to facilitate movement of the delivery object onto the platform; and
an electronic control unit (ECU) coupled to the input/output port, the power source, the inductive charging pad, the steering actuator, and the loading actuator and configured to:
  receive the identifier of the delivery object and the delivery address, control the power source and the steering actuator to move the main body through a warehouse to a location of the delivery object, control the loading actuator to facilitate the movement of the delivery object onto the platform, control the power source and the steering actuator to move the main body to the delivery address, charge the battery of the delivery object based on the delivery address or an order of delivery of the delivery object, receive data indicative of a request for at least one worker to perform the installation or repair work on or with the delivery object, and notify the at least one worker regarding the installation or repair work on or with the delivery object.

9. The autonomous workhorse vehicle of claim 8, further comprising:

a payment mechanism configured to receive payment; and a distribution lock configured to retain a rentable object in place on the platform, wherein the ECU is further configured to:
receive, from the input/output port, a rent request corresponding to a request to rent the rentable object,
determine that the payment mechanism has received the payment, and
cause the distribution lock to release the rentable object in response to receiving the rent request and in response to determining that the payment mechanism has received the payment.

10. The autonomous workhorse vehicle of claim 8, further comprising a loading sensor configured to detect when the delivery object has been removed from the platform, wherein the ECU is further configured to control the power source and the steering actuator to cause the main body to at least one of return to a home location or travel to a new delivery address in response to the loading sensor detecting that the delivery object has been removed from the platform.

11. The autonomous workhorse vehicle of claim 8, further comprising:

a payment mechanism configured to receive payment; and a distribution actuator configured to actuate a for-sale object of the plurality of objects from the platform to a location away from the platform, wherein the ECU is further configured to:
receive the payment from the payment mechanism,
receive, from the input/output port, a request to purchase the for-sale object, and
cause the distribution actuator to actuate the for-sale object from the platform to the location away from the platform in response to receiving the payment and the request to purchase the for-sale object.

12. The autonomous workhorse vehicle of claim 8, wherein:

the input/output port is further configured to receive a return message from a user device indicating that the delivery object is being returned, and the ECU is further configured to generate a credit to an account associated with the user device in response to receiving, via the input/output port, the return message.

13. The autonomous workhorse vehicle of claim 8, wherein:

the input/output port is further configured to receive an object return request corresponding to a request to return an object; and the ECU is further configured to control the loading actuator to facilitate loading the object requested to be returned onto the platform.

14. The autonomous workhorse vehicle of claim 8, wherein:

the input/output port is further configured to receive a pickup request corresponding to a request to pick up an individual and including a pickup address, and the ECU is further configured to control the power source and the steering actuator to move the main body to the pickup address to pick up the individual prior to moving to the delivery address.

15. The autonomous workhorse vehicle of claim 8, wherein:

the delivery object is a generator configured to convert fuel into electricity, the input/output port is further configured to receive a power indicator indicating that electrical power is unavailable at the delivery address, and the ECU is further configured to control the power source and the steering actuator to move the main body to the delivery address in response to the input/output port receiving the power indicator.

16. The autonomous workhorse vehicle of claim 8, wherein:

the ECU is further configured to control the power source to charge the battery of the delivery object while the main body is traveling to the delivery address.

17. The autonomous workhorse vehicle of claim 8, wherein:

the input/output port is further configured to receive a delivery time corresponding to a time of day at which delivery is desired; and the ECU is further configured to control the power source and the steering actuator to cause the main body to reach the delivery address within a predetermined amount of time of the delivery time.

18. The autonomous workhorse vehicle of claim 8, further comprising a power port coupled to the power source and configured to port at least some of the power from the power source to an external device such that the autonomous workhorse vehicle functions as a mobile generator.

19. A method for autonomously delivering one or more objects, comprising:

receiving, by an input device, an identifier of a leading vehicle;

determining, by an electronic control unit (ECU), a following time to begin following the leading vehicle;

detecting, by a tracking sensor, a location of a main body relative to the leading vehicle, the main body having a platform for supporting the one or more objects;

wirelessly charging, by an inductive charging pad coupled to the platform, a battery of the one or more objects based on a delivery address or an order of delivery of the one or more objects;

receiving data indicative of a request for at least one worker to perform an installation or repair work on or with at least one of the one or more objects requiring or being required for the installation or repair work;

notifying the at least one worker regarding the installation or repair work; and controlling, by the ECU and based on the detected location of the main body relative to the leading vehicle, a power source and a steering actuator to move the main body to follow the leading vehicle at the following time.

20. The method of claim 19, further comprising:

receiving, by the input device, user input indicating that the main body is to follow a leading person;

detecting, by the tracking sensor, a location of the main body relative to the leading person; and controlling, by the ECU and based on the detected location of the main body relative to the leading person, the power source and the steering actuator to move the main body to follow the leading person in response to the input device receiving the user input.

\* \* \* \* \*